(12) United States Patent
Portman et al.

(10) Patent No.: US 6,445,573 B1
(45) Date of Patent: Sep. 3, 2002

(54) SPRING CAM MECHANISM FOR STOWING A MONITOR

(75) Inventors: John Portman, Anaheim; James Schoen, Alisio Viejo, both of CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 62 days.

(21) Appl. No.: 09/654,005

(22) Filed: Sep. 1, 2000

(51) Int. Cl.$^7$ ................................................. H05K 7/00
(52) U.S. Cl. ........................ 361/681; 361/682; 312/215; 312/7.2; 312/245; 312/246; 349/56; 349/58; 348/837; D14/126; D14/132
(58) Field of Search ............................... 361/681, 682, 361/683, 724, 725, 726, 825; 312/215, 223.1, 223.2, 7.2, 246, 245; 349/56, 58; 348/837; D14/126, 132

(56) References Cited

U.S. PATENT DOCUMENTS

| | | | | |
|---|---|---|---|---|
| 5,096,271 A | * | 3/1992 | Portman | .................... 312/7.2 |
| 5,177,616 A | * | 1/1993 | Riday | ......................... 348/837 |
| 5,811,791 A | * | 9/1998 | Portman | .................... 250/221 |
| 6,157,418 A | * | 12/2000 | Rosen | ........................ 348/837 |
| 6,256,078 B1 | * | 7/2001 | Ogata | ......................... 349/58 |
| D446,507 S | * | 8/2001 | Rosen et al. | ............... D14/132 |

* cited by examiner

*Primary Examiner*—Darren Schuberg
*Assistant Examiner*—David Foster
(74) *Attorney, Agent, or Firm*—Nathan O. Jensen; Kyle Eppele

(57) ABSTRACT

An apparatus is described which includes a frame, a video monitor display mounted to the frame, a torque shaft coupled to the frame such that rotation of the torque shaft causes the frame to pivot along a predetermined arc. The apparatus further involves engaging to the torque shaft to impart rotational motion to the torque shaft, a releasable cam follower slidably disposed on the cam shaft and a spring mounted on the cam shaft exerting a spring bias force directed toward the cam so as to cause rotational motion of the cam.

17 Claims, 6 Drawing Sheets

| | | | | | | | |
|---|---|---|---|---|---|---|---|
| Monitor Moment = | | 35.0 | in*lbs | | LHC-187R-7 | | |
| Monitor Pre-load (1g) = | | 35.0 | in*lbs | | OD | 1.460 | |
| Back Driving Torque = | | 0.00 | in*lbs | | Wire | 0.187 | |
| | | Measured | | | Length | 5.000 | |
| Cam Radius = | | 0.827 | | | Solid | 2.474 | |
| Drive Ratio = | | 1.037 | | | Total Deflection | 3.034 | |
| Back Drive Torque = | | 0.00 | in*lbs | | Preload | 1.100 | |
| Side Adjacent | | 0.072 | | | Rate | 77.0 | |

| Deploy Angle | Monitor Torque | Torque Req'd | Cam Angle | Spring Force Req'd @ Angle | Side Opposite Delta Travel | Total Travel | Actual Force at Travel |
|---|---|---|---|---|---|---|---|
| -10 | | | 45.00 | | | -0.144 | 73.6 |
| -5 | | | 45.00 | | 0.072 | -0.072 | 79.2 |
| 0 | 35.00 | 70.00 | 45.00 | 84.6 | 0.072 | 0.000 | 84.7 |
| 5 | 34.87 | 69.87 | 43.20 | 90.0 | 0.068 | 0.068 | 89.9 |
| 10 | 34.47 | 69.47 | 41.60 | 94.6 | 0.064 | 0.132 | 94.9 |
| 15 | 33.81 | 68.81 | 40.00 | 99.2 | 0.061 | 0.193 | 99.5 |
| 20 | 32.89 | 67.89 | 38.30 | 103.9 | 0.057 | 0.250 | 103.9 |
| 25 | 31.72 | 66.72 | 36.70 | 108.2 | 0.054 | 0.303 | 108.1 |
| 30 | 30.31 | 65.31 | 35.20 | 112.0 | 0.051 | 0.354 | 112.0 |
| 35 | 28.67 | 63.67 | 33.60 | 115.9 | 0.048 | 0.402 | 115.7 |
| 40 | 26.81 | 61.81 | 32.10 | 119.1 | 0.045 | 0.447 | 119.2 |
| 45 | 24.75 | 59.75 | 30.60 | 122.2 | 0.043 | 0.490 | 122.4 |
| 50 | 22.50 | 57.50 | 29.00 | 125.4 | 0.040 | 0.530 | 125.5 |
| 55 | 20.08 | 55.08 | 27.40 | 128.5 | 0.037 | 0.568 | 128.4 |
| 60 | 17.50 | 52.50 | 25.80 | 131.3 | 0.035 | 0.602 | 131.1 |
| 65 | 14.79 | 49.79 | 24.30 | 133.3 | 0.033 | 0.635 | 133.6 |
| 70 | 11.97 | 46.79 | 22.70 | 135.8 | 0.030 | 0.665 | 135.9 |
| 75 | 9.06 | 44.06 | 21.10 | 138.1 | 0.028 | 0.693 | 138.1 |
| 80 | 6.08 | 41.08 | 19.50 | 140.3 | 0.026 | 0.719 | 140.0 |
| 85 | 3.05 | 38.05 | 18.00 | 141.6 | 0.023 | 0.742 | 141.8 |
| 90 | 0.00 | 35.00 | 16.40 | 143.8 | 0.021 | 0.763 | 143.5 |
| 95 | -3.05 | 31.95 | 14.90 | 145.2 | 0.019 | 0.783 | 145.0 |
| 100 | -6.08 | 28.92 | 13.40 | 146.8 | 0.017 | 0.800 | 146.3 |
| 105 | -9.06 | 25.94 | 12.00 | 147.6 | 0.015 | 0.815 | 147.5 |
| 110 | -11.97 | 23.03 | 10.60 | 148.8 | 0.014 | 0.829 | 148.5 |
| 115 | -14.79 | 20.21 | 9.30 | 149.2 | 0.012 | 0.840 | 149.4 |
| 120 | -17.50 | 17.50 | 8.00 | 150.6 | 0.010 | 0.851 | 150.2 |
| 125 | -20.08 | 14.92 | 6.80 | 151.3 | 0.009 | 0.859 | 150.9 |
| 130 | -22.50 | 12.50 | 5.70 | 151.5 | 0.007 | 0.866 | 151.4 |

FIG. 6

SPRING CAM MECHANISM FOR STOWING A MONITOR

FIELD OF THE INVENTION

The present invention relates to video display units that can stow and display a monitor.

BACKGROUND

Entertainment and information systems aboard aircraft have been made available to passengers for their comfort. Such systems can include television monitors that display movies and other programming, including safety instructions. Monitors can be stowed in the ceiling of the passenger cabin and are typically attached to a hinge allowing for rotational deployment from a cavity in the ceiling. An electric motor typically provides the power enabling rotational deployment, including retraction of the monitor when not in use. Electrical power necessary to deploy and retract the monitors comes from that generally available to the aircraft for use by the cabin during flight. It is therefore desirable to reduce power consumption to enhance efficient usage of on board systems.

In an emergency situation, deployed monitors can be a significant obstacle to both movement and line of sight for passengers. As such, where the aircraft cabin loses electrical power, Federal Aviation Administration regulations require that all monitors be retracted and stowed in a specific time frame of approximately five seconds. Where monitors were of a smaller size, i.e., approximately 8.4 to 9 inches, a battery or other stored power source within the monitor could suffice to automatically retract the monitors and comply with the FAA regulations, even though this extra power source constituted a further drain on energy needed to charge and maintain potency. Furthermore, this is less feasible for larger size screens, i.e., those 15 inches and larger, which required significantly greater rotational force to be generated in order to automatically retract them in the time period required. Additionally, these larger screens, with their greater power consumption for rotational motion, benefit from a more efficient source of rotational force. Torsion springs are the most common mechanism currently used for this purpose, but are not very efficient from a systems operation standpoint. This is due to the fact that less torque is required when the monitor is deployed than stowed which is opposite of the operation of torsion springs.

SUMMARY

An apparatus is described which includes a frame, a video monitor display mounted to the frame, a torque shaft coupled to the frame such that rotation of the torque shaft causes the frame to pivot along a predetermined arc. The apparatus further involves engaging to the torque shaft to impart rotational motion to the torque shaft, a releasable cam follower slidably disposed on the cam shaft and a spring mounted on the cam shaft exerting a spring bias force directed toward the cam so as to cause rotational motion of the cam.

BRIEF DESCRIPTION OF THE DRAWINGS

The invention is illustrated by way of example and not by way of limitation in the figures of the accompanying drawings in which like references indicate similar elements and in which:

FIG. 6 is a table showing relative forces and torques for the display monitor of the invention at particular deployment angles.

DETAILED DESCRIPTION

Figure 1:
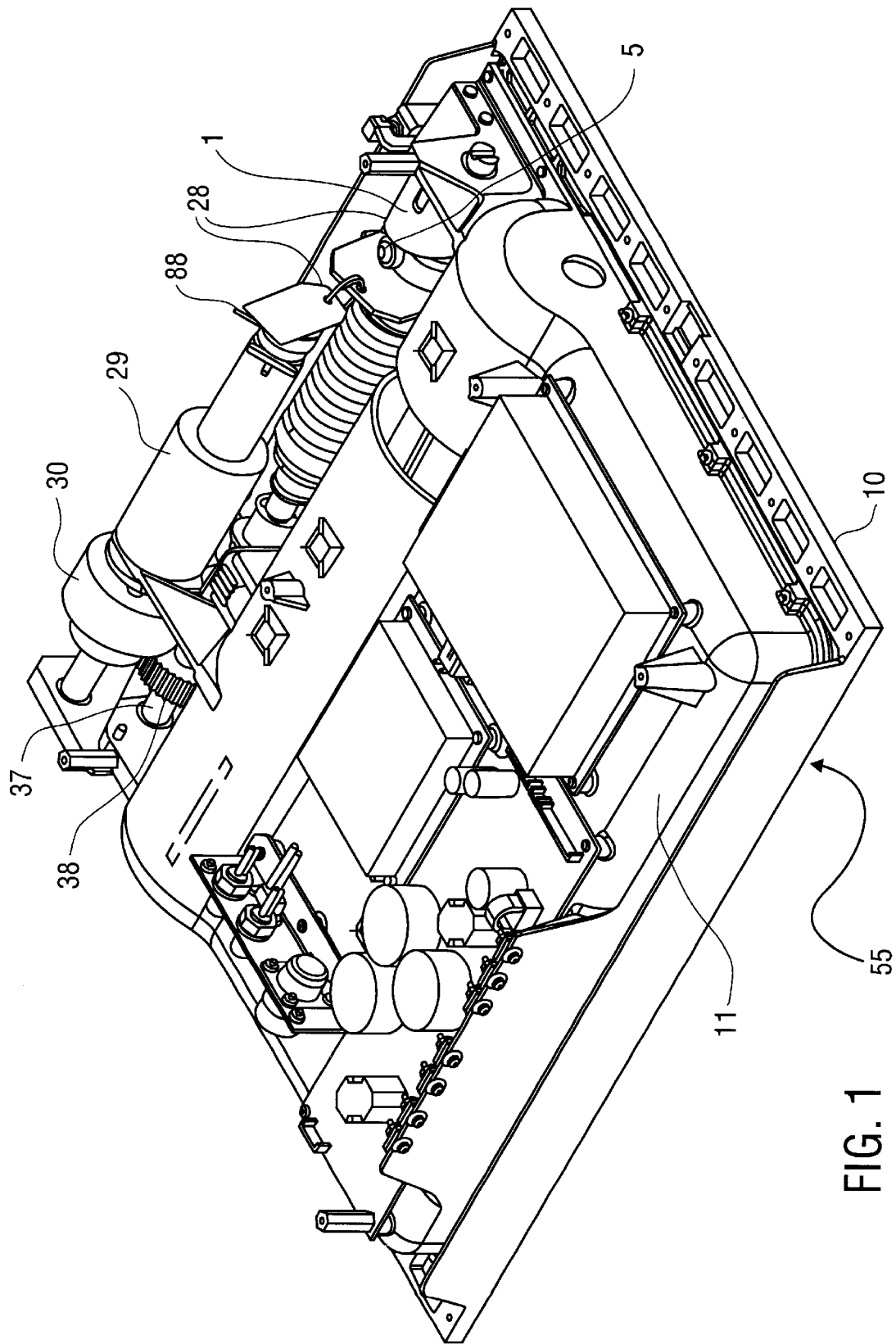
FIG. 1 illustrates a side perspective view of the invention showing a video display monitor in a retracted position.

Referring to the drawings more particularly by reference number, FIG. 1 shows a side perspective view of the display unit of embodiment of the present invention. Frame 10 houses the display screen 55 and components related to the video monitor (collectively identified as 11). Frame 10 is rotationally coupled to torque shaft 37 extending laterally across frame 10 for mounting within a cavity where the monitor will be stowed and deployed from (not pictured). Torque shaft 37 includes torque shaft gear 38 engaged to slip clutch 30 with which gear 38 meshes. Slip clutch 30 is connected to output shaft (not pictured) of electric gear motor 29. Also attached to the output shaft is magnetic brake 88.

Frame 10 and inclusive monitor can be stowed in a substantially horizontal position within a cavity within the ceiling above the seating area in the cabin. To deploy the monitor, electric gear motor 29 activates slip clutch 30 causing rotation of the meshed gear 38 mounted on torque shaft 37 so that frame 10 rotates in a pivotal arc until it reaches a substantially vertical position, perpendicular to the cabin ceiling. It may also be appreciated, that frame 10 can be deployed over an arc greater than 90 degrees, i.e., to 120 or 130 degrees, in order to accommodate the viewing angles of passengers seated below the monitors. A downsensor wheel 31 and infrared gate sensor 15 may be used to sense the position of the monitor and accordingly engage brake 88 to halt further rotation at the desired position. Other methods of sensing position known in the art may also be utilized.

In this regard, spring cam assembly, 28 may be mounted between torque shaft 37 and motor 29 and motor shaft (not pictured). In an alternate embodiment, spring cam assembly 28 can be mounted directly on torque shaft 37. The degree of rotational motion may be regulated by co-rotational motion of this assembly, and especially cam 1 (pictured in FIGS. 2–5), between two points on the shaft represented by the placement of bearing 5 on the assembly inhibiting further cam rotation. Slip clutch 30 may also be constructed so as to disengage from gear 38 upon the application of a pre-determined amount of force, allowing torque shaft 37 to rotate frame 10 and inclusive monitor, upward to a stowed position.

Figure 2:
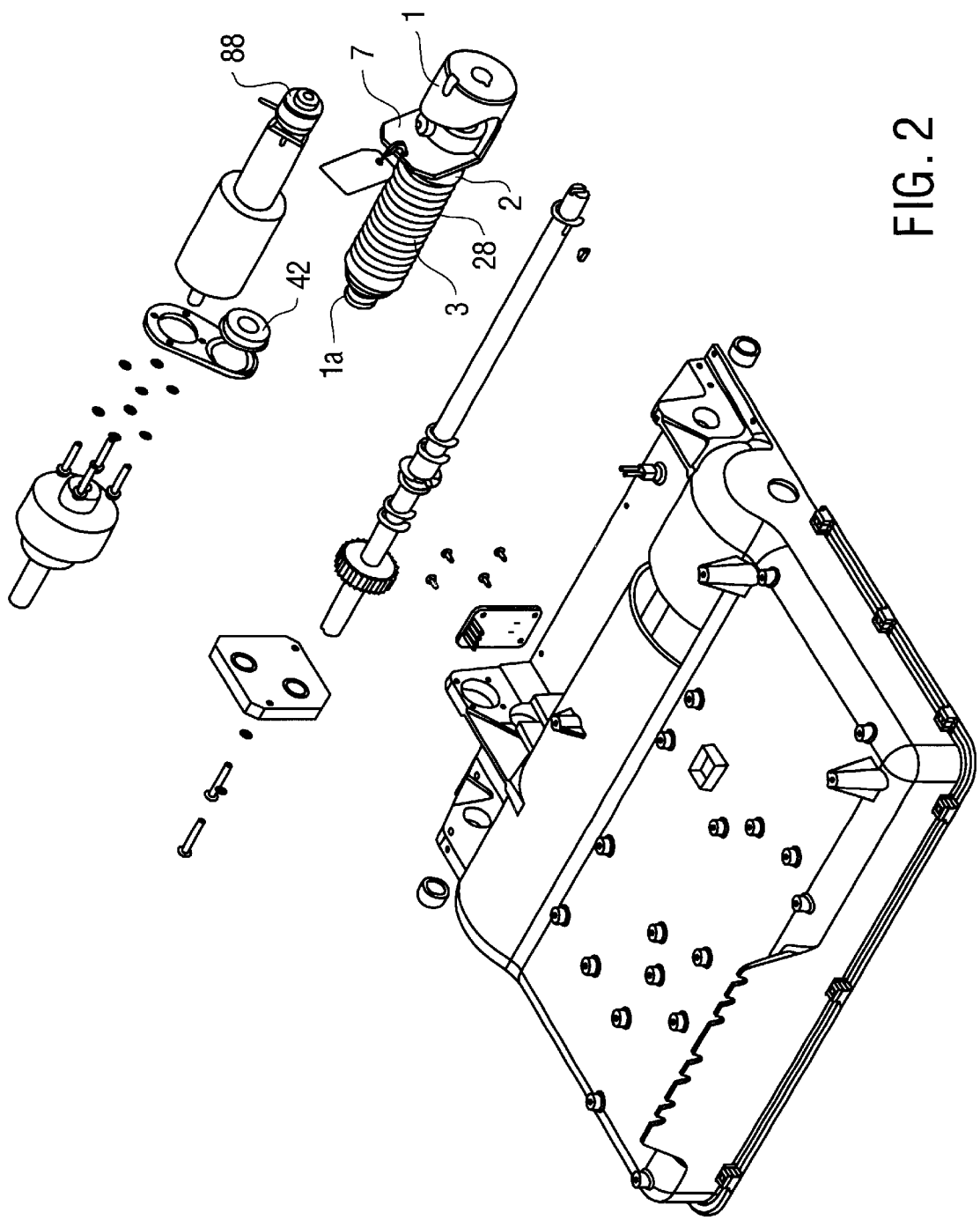
FIG. 2 illustrates a partially exploded view of the display unit of FIG. 1 showing the cam rotational assembly of the invention.

FIG. 2 shows an exploded view of one embodiment of the invention. In this view the spring cam assembly 28 and its elements are more clearly viewed. Assembly 28 includes cam 1 and cam shaft 1a which is coupled to precision ball bearing 42 at bearing clamp 39. In addition to the aperture for cam 1 and bearing 42, clamp 39 includes a second aperture where motor 29 is coupled to clutch 30. Compression spring 3, is threaded around cam shaft 1a. Adjusters (not pictured) maintain spring 3 centered on cam shaft 1a. Cam follower 2 sits between cam 1 and spring 3 on cam shaft 1a. Torque stop 7 is shown in this figure, as installed after manufacture, but is withdrawn upon installation of assembly 28 and prior to its operation. Fastening means pictured for this embodiment of the invention include screws 41 and washers 56 affixing bearing clamp 39 to motor 29 around output shaft where clutch 30 is fitted onto motor 29. Similarly, drive end plate 36 is fitted onto torque shaft 37 and clutch 30 at apertures 72.

Figure 3:
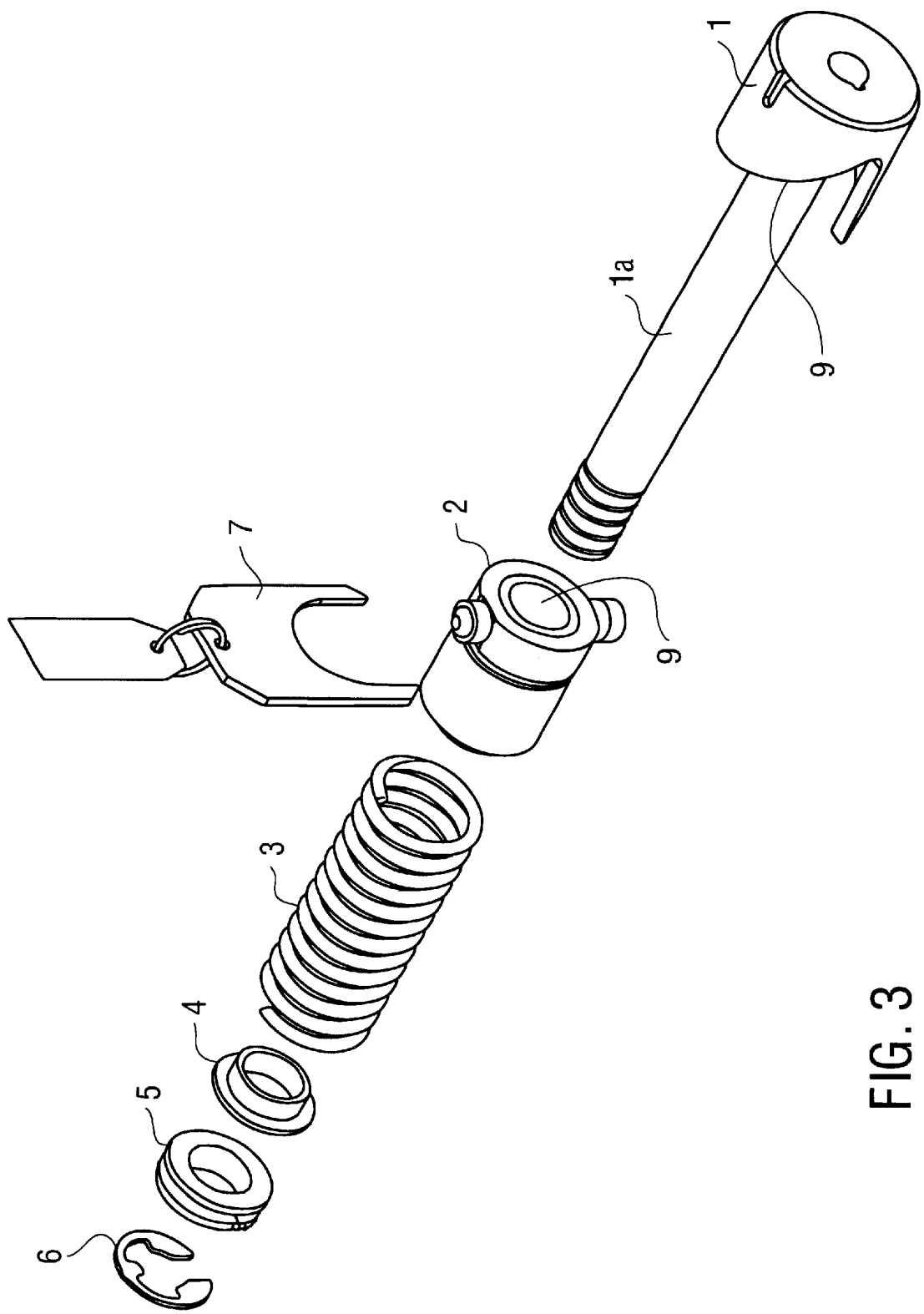
FIG. 3 illustrates an exploded view of the spring cam assembly of the invention.

FIG. 3 shows an exploded view of the cam assembly of one embodiment of the invention. In its operation, cam 1 and cam shaft 1a are mounted on and co-rotate with torque shaft 37 when frame 10 and inclusive monitor are deployed by operation of motor 29 and clutch 30 on gear 38 of torque shaft 37. During co-rotation, cam follower 2 displaces along cam shaft 1a against compression spring 3 which is compressed against spring spacer 4 and thrust bearing 5. Compression by cam follower 2 imparts substantial potential energy contained within spring 3, biasing its force against cam follower 2, and hence against coupled cam 1. This potential energy and biasing force remains while frame 10 and inclusive monitor are deployed in the viewing position.

Brake 88 in FIGS. 1 and 2 prevents rotation of torque shaft 37 with cam follower 2 fixed thereon inhibiting relaxation of spring 3 from its compressed state. Where frame 10 and monitor are to be retracted to a stowed position, brake 88 relaxes and spring 3 exerts its bias force against cam follower 2. Once the brake is released, spring 3 is then free to expand, in turn the cam follower exerts translated bias force on cam 1 to counter rotate the cam and, thus, counter-rotating torque shaft 37 to retract monitor and frame 10 to its horizontal or stowed position.

Where the biasing force of the compressed spring will thus serve to retract the monitor either alone or in conjunction with a motor, the necessary electrical usage is minimized and the monitor is more efficiently operated, while still achieving FAA standards of "breakaway" or rapid retraction in a specific time period. Enabling this biasing force is the size and strength of the spring used. It is therefore preferable that the invention utilize a spring capable of retaining significant potential energy and which can generate sufficient force to retract a 15" or larger video monitor display. Typically, a 15" monitor has a mass in excess of at least 3 times the mass of a 6"–8" monitor. In this regard, a torsion spring, which is generally thinly constructed and yields only a modest bias force, is insufficient and also requires significant extra power from the motor to deploy. In contrast a compression spring, especially one which is heavy duty, and mated with a cam profile specifically designed for the application to the most efficient design, suffices. Within limits, if the spring rate is low, the cam face profile needs to be steep. If the spring rate is high, the cam face profile needs to be shallow. Given their higher stress levels, torsion springs typically also enjoy an operational life only 1/10 as long as a compression spring.

Figure 4:
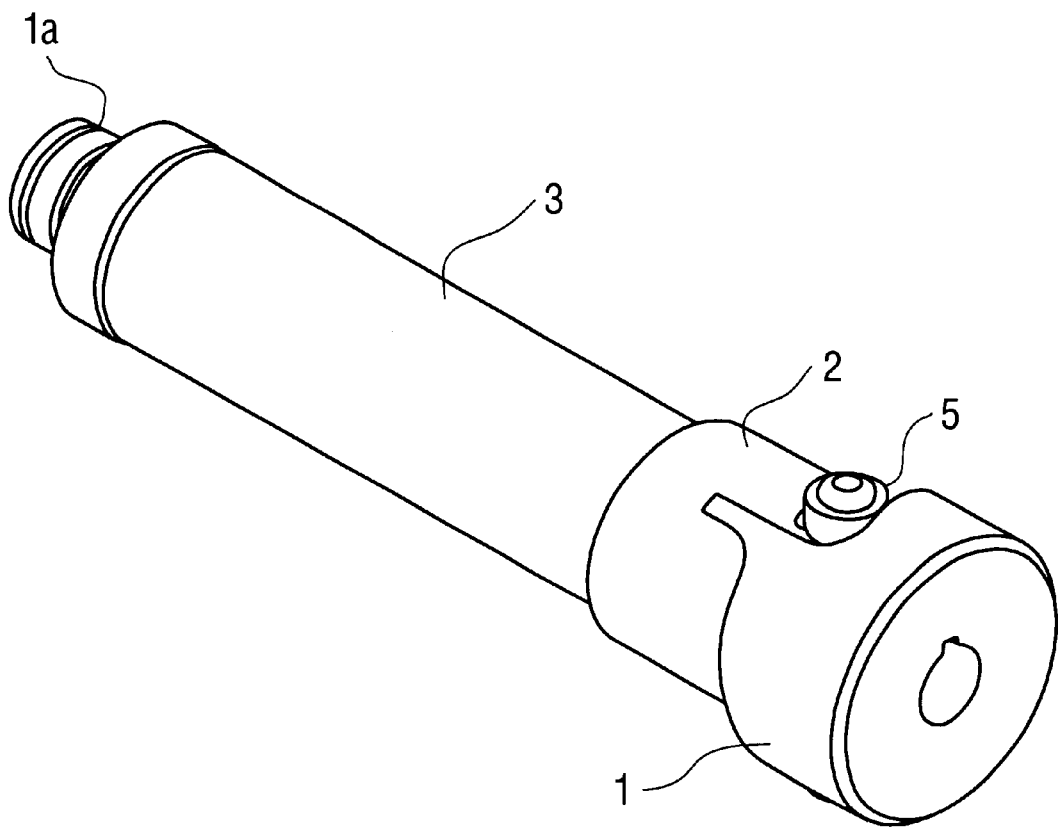
FIG. 4 shows a side perspective view of the spring cam assembly of the invention.
Figure 5:
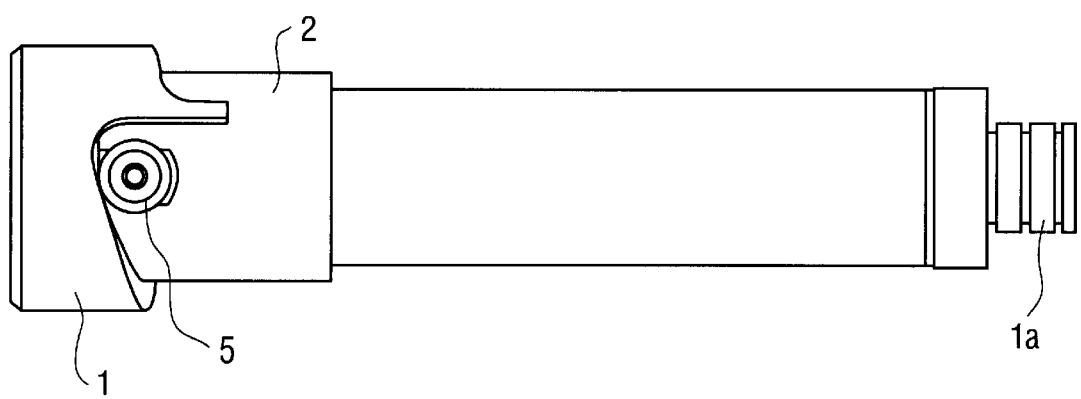
FIG. 5 shows a side view of the spring cam assembly of the invention.

FIGS. 4 and 5 provide further illustrations of the cam assembly, including cam follower 2 which is slidably mounted on cam shaft 1a so as to compress a spring (not pictured) mounted thereon. Bearing 5 provides the stop point for cam 1 rotation about the longitudinal axis of cam shaft 1a and also provides a stop point for the lateral movement of cam follower 2 toward cam 1 when impelled by expansion of a compressed spring.

FIG. 6 is a table showing the torque and spring forces exerted by the monitor, cam and spring in one embodiment of the invention depending on the angle of monitor deployment. The table refers to the forces and torque necessary to stow a 15" video monitor. As is evident, spring force required to maintain the monitor at a horizontal ceiling position, i.e. in its stowed position, is 84.7 lbs. This spring force increases to 151.4 lbs. to retract the monitor from a pivoted position 130 degrees from the horizontal. Cam face angle of rotation over this period is between 45 degrees and 5.70 degrees. Compression distance in the spring is reflected in the "total travel" portion of the tableDelta travel is the distance from one step to another.

Thus the figures show to retract a 15" video monitor from a 130 degree deployment angle, 151.4 lbs. of force is required from the spring. Due to friction, the compression spring utilized imparts slightly less than this, yet is sufficient to retract the monitor to its stowed position. When the compression spring 3 is at 84.6 lbs. of force, it provides 70.0 in/lb. of torque to keep the monitor stowed. When it is at 151.4 lbs. of force, it provides 12.5 in/lb. of torque to direct the monitor stowed. If a torsion spring were used to achieve 70.0 in/lb. of torque to keep the monitor stowed, the deployed torque would be 115.8 in/lbs.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising:
   a frame;
   a video monitor display mounted to the frame;
   a torque shaft coupled to the frame such that rotation of the torque shaft causes the frame to pivot along a predetermined arc;
   a cam having a cam shaft with a first end and a second end, the cam operatively coupled to the torque shaft for imparting rotational motion to the torque shaft;
   a releasable cam follower slidably disposed on the cam shaft first end such that upon rotation of the cam the cam follower moves along the cam shaft toward the second end;
   a spring mounted on the cam shaft second end having a spring bias force directed toward the cam shaft first end, the spring operatively coupled to the cam so as to cause rotational motion of the cam.

2. The apparatus of claim 1, further comprising: a power source coupled to the torque shaft.

3. The apparatus of claim 2, further comprising: a clutch coupled to the power source and engaging the torque shaft so as to regulate rotational motion.

4. The apparatus of claim 1 wherein the spring is a compression spring.

5. The apparatus of claim 4, wherein the compression spring exerts a biasing force of between 140 and 405 pounds per inch in rotating the cam.

6. The apparatus of claim 1 wherein the apparatus predetermined pivot arc is between a first position where the apparatus is stowed and a second position where the monitor can be viewed by a viewer.

7. The apparatus of claim 2 wherein the power source rotates the apparatus from a first position where the apparatus is stowed to a second position where the monitor can be viewed by a viewer.

8. The apparatus of claim 2 wherein the power source is an electric motor.

9. The apparatus of claim 1 wherein the apparatus may be viewed by a viewer when in a second position and stowed while in a first position, and the bias force of the spring pivots the apparatus from the second position to the first position.

10. The apparatus of claim 1, wherein the display unit further comprises a brake operatively connected to the power source adapted to hold the monitor in the second position.

11. The apparatus of claim 9, wherein upon application of a pre-determined force against the apparatus while deployed in the second position, the cam follower releases the bias force of the spring to rotate the apparatus to the first position.

12. A display unit having a video monitor, the display unit attached to a structure comprising:
   a torque shaft coupled to the display unit;
   a power source coupled to the torque shaft imparting rotational motion to the display unit;
   a cam shaft coupled to the power source;
   a cam coupled to the cam shaft operatively engaging the display unit such that when the cam is rotated the display unit is moved from a first position where it is stowed to a second position where the unit can be viewed by a viewer;
   a releasable cam follower mounted on the cam shaft and engaging the cam such that rotation of the cam displaces the cam follower along the cam shaft in a first direction away from the cam;
   a spring mounted on the cam shaft and engaging the cam follower such that upon rotation of the cam to move the display unit from the first to the second position the cam follower compresses the spring and the bias force of the compressed spring rotates the cam so as to move the display unit from the second position to the first position.

13. The display unit of claim 12, wherein the spring is a compression spring.

14. The display unit of claim 13, wherein the compression spring exerts a bias force of between 140 to 404 pounds per square inch.

15. The display unit of claim 12, wherein the power source is an electric motor.

16. The display unit of claim 12, further comprising a brake operatively connected to the power source adapted to hold the monitor in the second position.

17. The display unit of claim 12, wherein when the display unit is in the second position, the cam follower releases upon the application of a pre-determined force to the display unit, and the spring bias force moves the display unit to the first position.

* * * * *